United States Patent Office 3,446,463
Patented May 27, 1969

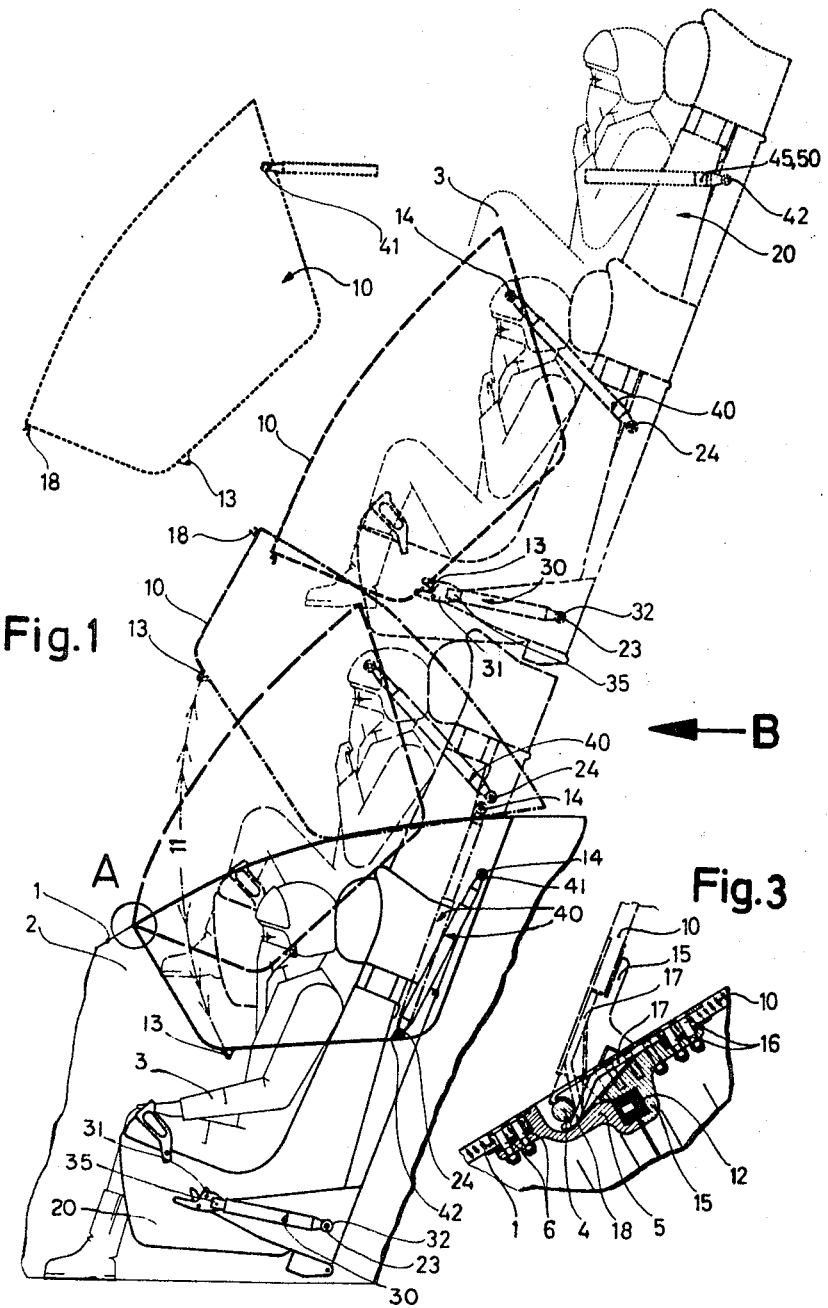

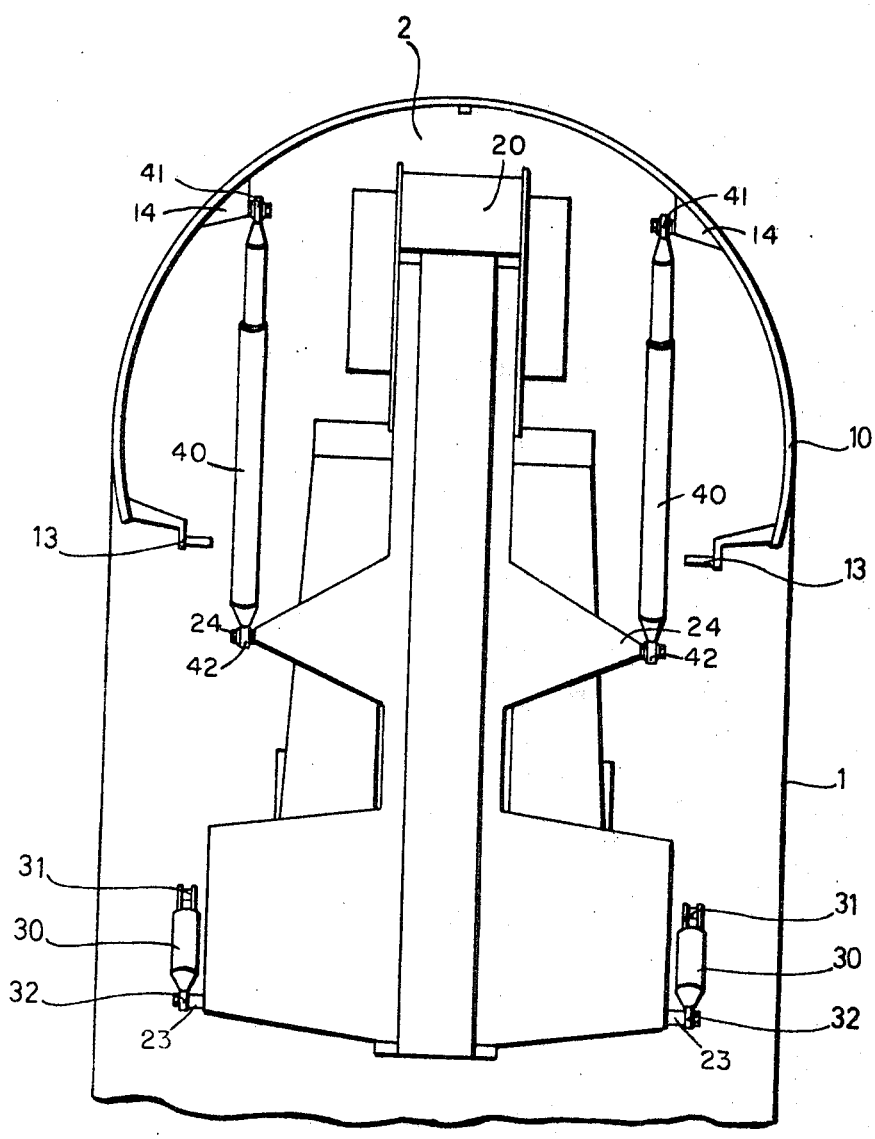

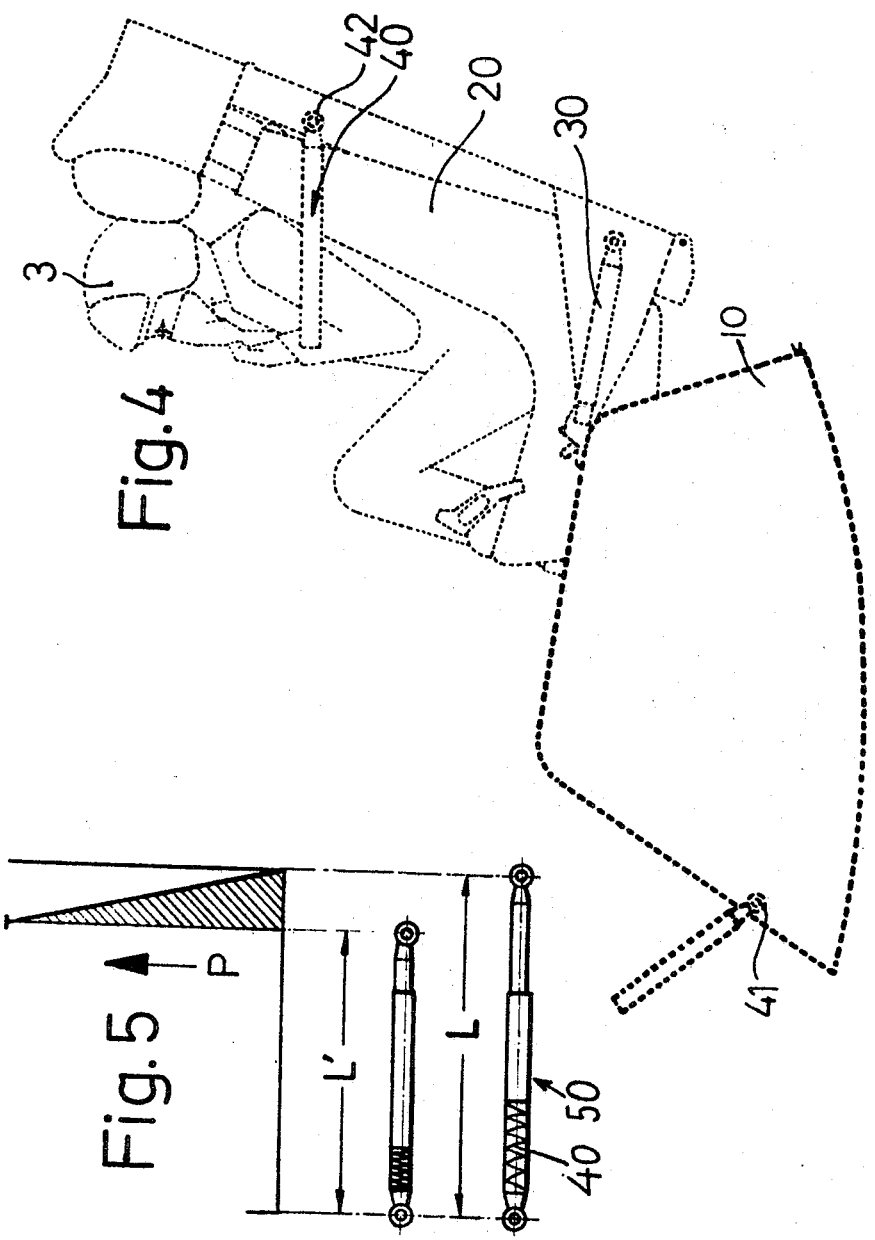

3,446,463
EJECTION SEAT SYSTEM
Manfred Feld, Grobenzell, and Herbert Lieser, Hans Lincks and Helmut Stockert, Munich, Germany, assignors to Entwicklungsring Sud G.m.b.H., Munich, Germany, a corporation of Germany
Filed Jan. 24, 1967, Ser. No. 611,279
Claims priority, application Germany, Jan. 25, 1966, E 30,922; Feb. 25, 1966, E 31,116
Int. Cl. B64d 25/10, 25/04; B64c 1/14
U.S. Cl. 244—121   16 Claims

ABSTRACT OF THE DISCLOSURE

A releasable canopy for aircraft structure flying near or above supersonic speeds wherein said canopy is disengageably pivoted at its forward end to the aircraft structure and is provided with telescoping separable linking means interengaging the canopy and the airplane structure and which upon movement pivot the canopy to disengage it from the pivoting means and position it in front of the ejection seat, and interlocking means including telescoping separable links which engage the canopy upon being released from the pivoting means to maintain it in position forwardly of the ejection seat, and pressure responsive means within said links for separating the links to release the canopy from the seat.

---

The present invention relates to an ejection seat system and means releasing the roof section or canopy above the ejection seat, particularly for aircraft and space vehicles, flying near or above supersonic speeds, which incorporate well known means for catapulting the ejection seat from the plane.

Presently, in the case of airplanes, in order not to interfere with the catapulting of the ejection seat of the pilot or observer, either the roof of the cabin must first be removed, as by blasting it off, or the roof of the cabin must be of such a nature that a piercing thereof during the catapulting of the ejection seat is possible.

At very high speeds it is also necessary to take precautions to protect the pilot from the dynamic air pressure by a special face shield, or by louver-like devices which have to be pulled up or down by the pilot before the catapulting.

It has also been proposed, in the case of airplanes, to provide an enclosure for the seats of the persons to be catapulted, for instance a sphere, and then to catapult the enclosure, so as to protect the person or persons from the action of the dynamic air pressure.

It has also been proposed to blast off the nose of the fuselage as a unit, so as to protect the passengers from the dynamic pressure at high speeds.

With respect to the prior art, reference may be had to U.S. Patent 2,985,413. If the catapulting of the seat is necessary in vertical take-off or landing of planes at a flying speed of O, then precious fractions of a second have passed before the cabin roof has loosened itself from the airplane, as only then may the catapulting of the seat be started. The same is true in the case of airplanes which fly at very high velocity and which involve the added factor that it is necessary to actuate a dynamic-pressure protection to protect the passengers from the consequences of excessively high pressures, again delaying ejection.

The system disclosed herein makes it possible to greatly increase the dependability of ejection seats by saving valuable time, and in addition, eliminates the need for an additional dynamic pressure protection device, resulting in considerable simplification.

The invention also provides an ejection seat system, including a device for throwing off the roof of the cabin located above the ejection seat, particularly useful for airplanes and space ships. Means are provided which make it possible to simultaneously detach the roof section or canopy of the cabin, and catapult the seat out of the aircraft, with the roof section becoming a protective screen for the seat occupant. In accordance with the invention, the canopy is connected in a manner to effect a rotation of the roof section around the points where it is pivoted in one direction for the purpose of normal entrance and exit, and in the other direction to position the roof section as a protective screen during and after the catapulting.

For this purpose there may be provided stops or stop struts on the ejection seat which limit the position of the protective screen and similar means for the locking of the roof section in such a limited position. When in this protective-screen position, the canopy may be released from the ejected seat by pressure responsive means, preferably explosive charges, in the links and/or stop struts.

Moreover, the arrangement may be entirely automatic thus relieving the pilot of any metal work or manual manipulations. This objective is achieved by an automatic main release device controlled by a Machmeter and an altimeter, and further measuring instruments which, depending upon existing conditions, selects whether upon the catapulting of the ejection seat the cabin roof section is pivoted to function as a protective screen or is blasted off before the detachment of the ejection seat.

As a further development of the invention, all further arrangements and mechanisms are controlled directly or indirectly with regard to nature, time and function sequence, or placed in operation by the automatic main release system, in which case upon the selection of "cabin-roof section as a protective screen on ejection seat," the cabin-roof section supports and the cabin-roof mounts are disconnected, and at the same time a mechanism is actuated to temporarily check the front-roof support and the support levers of the telescopic pressure cylinder. Upon selection of the "ejection seat without protective screen" the automatic main release system releases the cabin-roof mounts and the cabin-roof supports and at the same time a mechanism for preventing the arresting of the bearing forks of the telescopic pressure cylinder which engages into the cabin roof, and this mechanism in its turn places in operation a time delay element for the firing of the ejection-seat gun.

In the course of the further development of the subject matter of the invention it is proposed that the cabin-roof mounts bring about the outward movement and the arresting of the two telescopic pressure cylinders.

One essential feature of the invention is that catch forks located on the ejection seat which receive and arrest the catch pins of the cabin roof and at the same time actuate a mechanism for detaching the telescopic pressure cylinders and a shock absorber system, and to provide the catch forks with automatic detonators controlled by the speed indicator for the explosive charges.

In a more particularly advantageous embodiment of an ejection-seat arrangement in accordance with the invention the automatic main release system, by means of a program control effects the unfolding of the decelerating-stabilization parachute in the ejection seat.

By the devices and arrangements in accordance with the invention all manipulations and maneuvers are removed from the pilot aside from the actuation of the ejection-seat trigger. Furthermore he is relieved from the decision as to whether an ejection with or without protective screen is necessary.

The invention will be explained in further detail with reference to the drawings, shown by way of example:

FIGURE 1 shows a catapulting operation, in different phases, as seen from the side;

FIGURE 2 is an ejection-seat system according to the invention, seen from the rear on an enlarged scale, in the direction indicated by the arrow B in FIGURE 1;

FIGURE 3 shows a detail of an interlock, in cross section;

FIGURE 4 shows an ejection-seat system in accordance with the invention, in which the cabin roof is swung out of the protective-screen position;

FIGURE 5 shows a link which can be lengthened and shortened telescopically and which is so developed that upon the shortening thereof an energy storage device can be charged;

Figure 6:
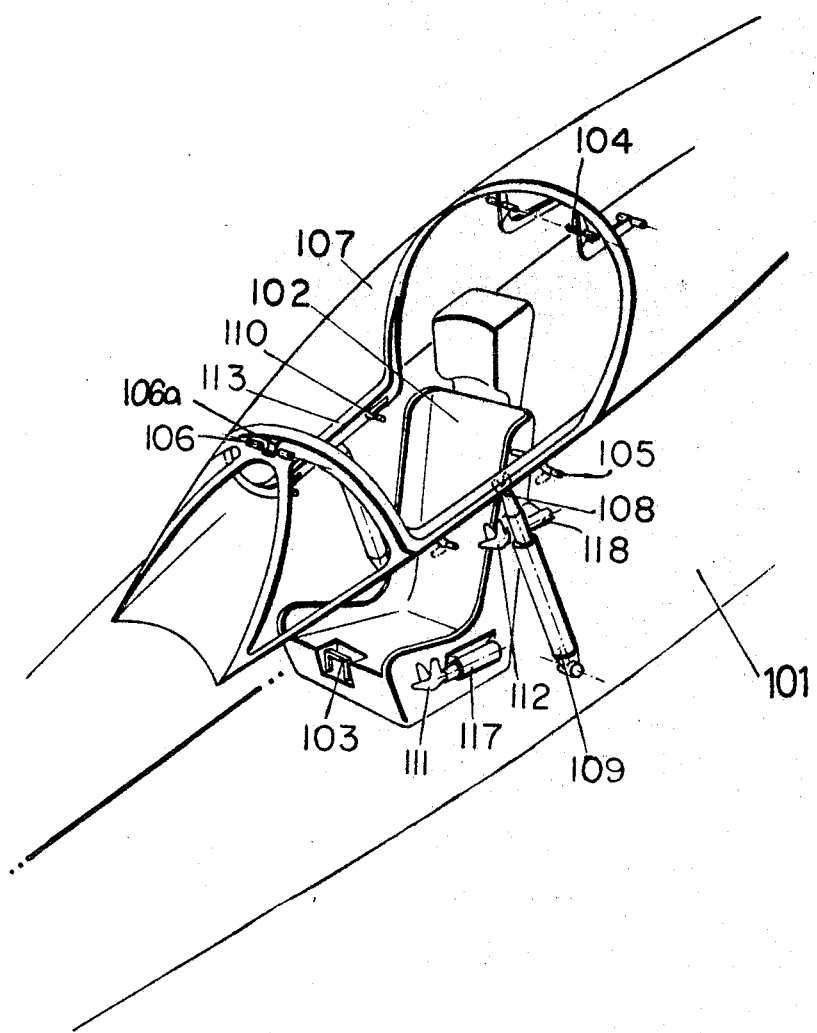
FIGURE 6 shows another embodiment of the ejection seat and the individual functional parts before actuation of another catapulting operation.

As can be noted from FIGURE 1, the plane structure 1 has an open top cabin 2, wherein there is a seat 20 for a passenger or the pilot 3, the top being covered by a movable cabin roof or canopy 10 (heavy outline), to permit entering and leaving. For this purpose the cabin-roof may be swung upward and rearward or clockwise about the pivot 14 (subsequently described) in the direction indicated by the arrow 11 so that it assumes the dash-dot line position shown in FIGURE 1, and before flight, is again brought into the closed position, corresponding to the solid line of FIGURE 1 and locked by means of a locking system at point A in FIGURES 1 and 3.

In FIGURE 3 the locking means at A are shown in cross section, the locking means also constituting a disengageable pivoting means being so constructed that the cabin-root can be turned counter-clockwise on a locking pin axis 4 upon catapulting, and the claw 17 may only disengage from the lock pin 4 when the cabin roof 10 is in the position shown in the long-dashed line with the upper surface thereof forwardly of and substantially parellel to the ejection seat and when so positioned, it acts as protective screen. The claw 17 is fastened by screws 16 to the frame 15 of the cabin roof 10, and has at its forward end, a hook 18 which prevents the opening of the cabin roof until lock pin 4 is withdrawn, as by being pulled out laterally. The end of hook 18 has an arc having substantially the same radius as pin 4 which underlies the pin until the end of the arc is approximately in horizontal alignment with the center of pin 4.

For the air-tight closing of the cabin roof there is provided a sealing strip 12 on the cabin-roof frame 15, which seals off the cabin roof 10 from the frame 5 which is fastened to the airplane 1 by screws 6, and within which the cabin-roof frame 15 is received.

If the seat 20 together with the occupant 3 is catapulted out of the plane 1 by well-known means, then the telescoping separable links 40 act as canopy actuating means. The links are pivoted at their upper ends 14 by link ends 41 to the roof section and at their lower end at 24 to the plane structure, and in this embodiment the ejection seat 20 by the link ends 42. The links 40 initially transmit the accelerating forces via the upper ends 41 to the pivot points 14 which pivot point is spaced from pivot pin 4 to provide the required leverage on the cabin roof, and the canopy is pivoted counter-clockwise around the lock pin 4 so that ejection seat 20, occupant 3 and cabin roof 10 assume the position shown in long-dashed lines in FIGURE 1 with the canopy functioning as a screen.

In the next phase of the catapulting shown in short-dashed line in FIGURE 1 the cabin roof has reached a position in which it is fixed with respect to the ejection seat by means of the interlock bolt 13 on the roof section which has been engaged by the seat carried interlock 31 on the forward end of the separable stop strut 30 as seen in the third seat position. When the speed of the ejected seat has decreased after the catapulting to such an extent that the pilot is no longer endangered by the dynamic pressure, the cabin roof 10 can be fully released from the ejection seat 20 by separating the links 30 and 40 as is shown in the last phase of FIGURE 1 by the position shown in dotted line of the ejection seat 20, the pilot 3 and the cabin roof 10.

Instead of a complete separation of the cabin roof from the ejection seat it may be advantageous in special cases to swing the cabin roof merely forward as shown for instance in FIGURE 4. In this embodiment only the separating devices in the links 40 are activated and the cabin roof 10 is thereby pivoted around the interlock pins 13. As seen in FIGURE 1, such separating devices may be in the form of an explosive charge 45 in the links 40 and 35 in the struts 30.

In the links 40 there may be provided, instead of an explosive, a type of force storage means 50. As seen in FIGURE 5, the force storage means 50 is a coil spring which is received in the chamber formed between the two telescoping portions of the link 40. Upon the catapulting off of the ejection-seat, the forces acting to accelerate the cabin roof will be partially employed to telescope the length 40 and thus compress the spring 50. The compressed sprink 50 thus represents stored energy which is represented by the hatch triangle in the graph of FIGURE 5. When the link has been telescoped into the length as represented by L', an automatic interlock is activated and will be released at a later time. Release of the roof section out of its shielding position is effected by a conventional acceleration meter (g-meter) or by pilot release.

Figure 7:
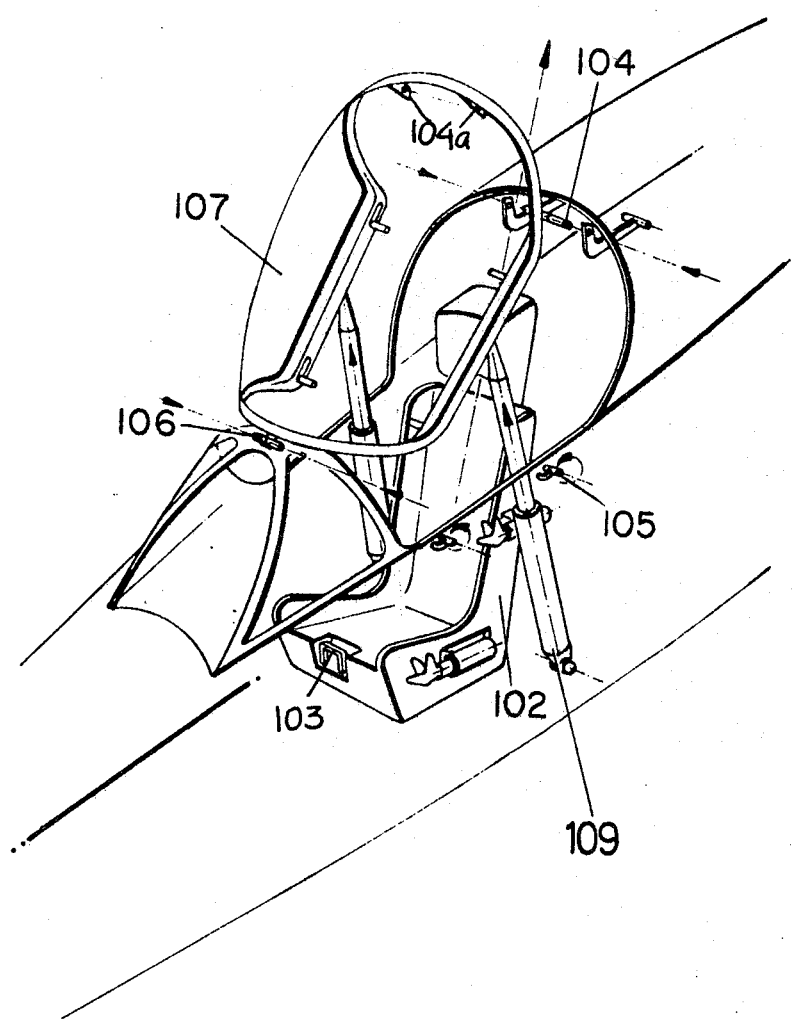
FIGURE 7 shows the arrangement of FIGURE 6 in the first phase after the catapulting actuation.

In FIGURE 6 there is shown another embodiment wherein the cabin roof section is used as a shield but wherein the seat is not connected to the cabin roof section until after it has commenced it upward ejection movement. The parts are positioned as in FIGURE 6, and when the main trigger 103 on ejection seat 102 is activated and the automatic main release mechanism has brought itself to the position "Cabin Roof as Protective Screen on Ejection Seat," driving pins 104 are automatically disengaged from rear cabin-roof support and the cabin-roof mounts 105 are automatically disengaged from the plane structure. Two bearing pins 106 are simultaneously automatically engaged with the forward cabin-roof support with the bearing forks 108 of telescopic cylinders 109 engaging the cabin-roof 107 at a point spaced from the forward pivot 106. The cabin-roof mounts 105 in the fully open position activate the two telescopic pressure cylinders 109 which then extend to open the cabin roof 107 by pivoting it counter-clockwise around the bearing pins 106 (FIGURE 7). Once the cabin roof is open, the main explosive charge of the ejection-seat gun is ignited and the ejection seat 102 is released from its holding members (FIGURE 8).

Figure 8:
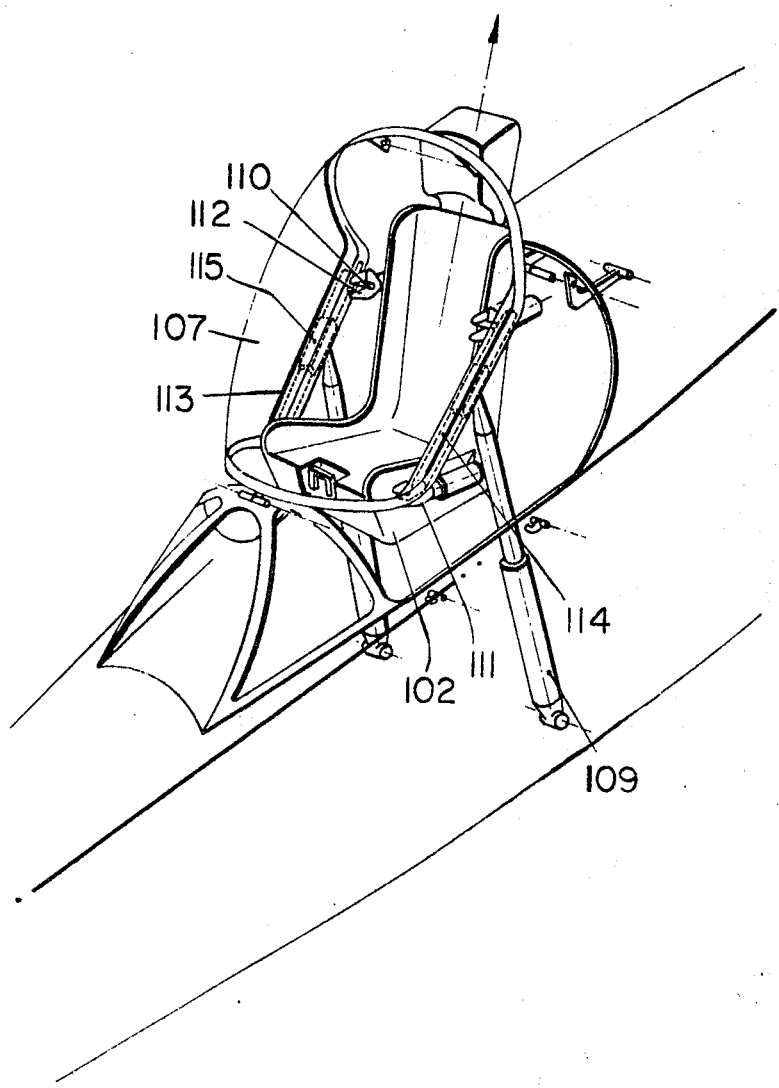
FIGURE 8 shows the arrangement of FIGURE 6 in the second phase after the actuation of the catapulting.

As the seat is powered upwardly by the seat gun to the position shown in FIGURE 8, catch bolts 110 of the cabin-roof 107 engage in the stop strut catch forks 111 and 112 located on the ejection seat 102. The catch forks, upon engagement of the catch pins 110, are self-locking to prevent the cabin-roof from sliding off upwardly.

The catch bolts 110 are rigidly secured to members 114 which are slidable in the linear portion of the cabin-roof frame. Engagement of the catch bolts 110 in the catch forks 111, 112 causes the slidable members 114 to move inwardly and to release the bearing forks 108. The sudden impact of the forks 111, 112 which is transmitted to the members 114 via the bolts 110 is taken up by a damper device 115 such as a coil spring or fluid chamber.

Figure 9:
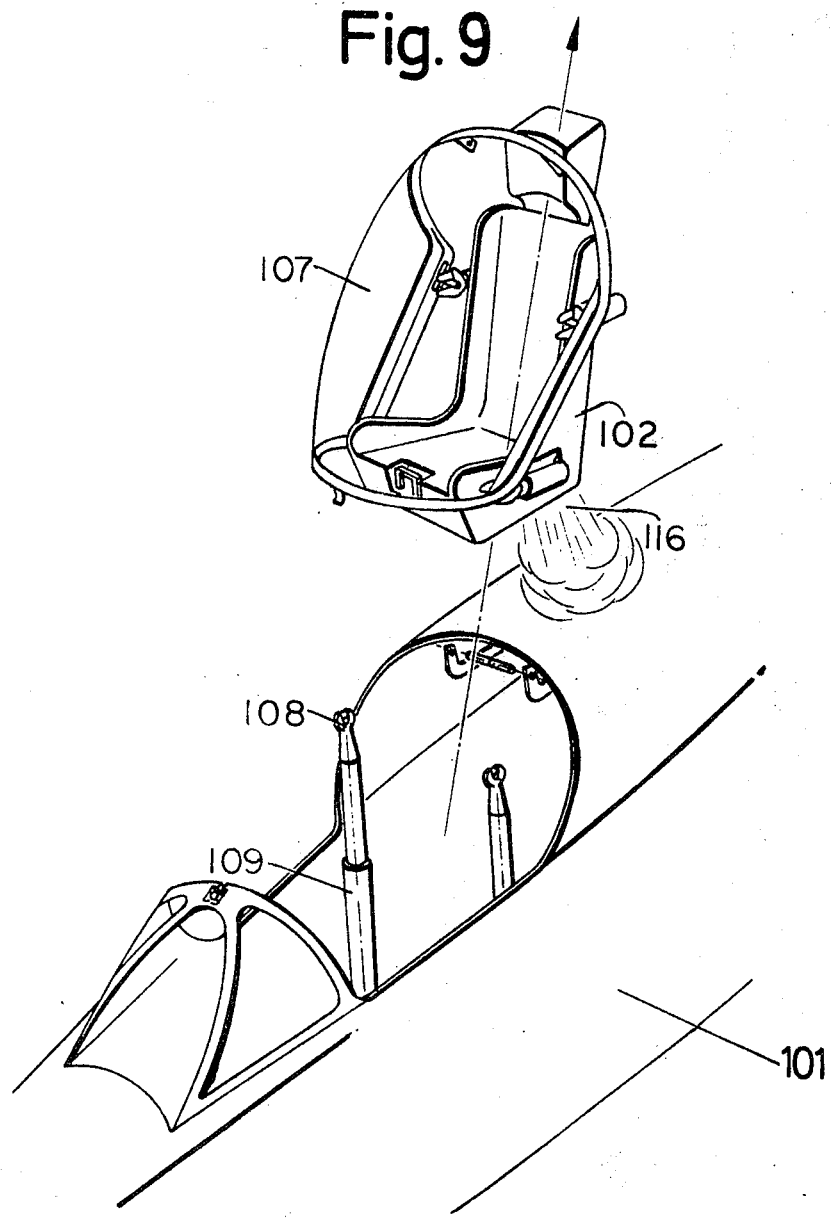
FIGURE 9 shows the arrangement of FIGURE 6 after the igniting of the ejection-seat catapulting gun.

Upon reaching the FIGURE 9 position, the cabin-roof 107 and the ejection seat 102 form a single unit which is completely separated from the airplane fuselage 101. At this time, a rocket propulsion charge 116 located on the bottom of the ejection seat is ignited and burned.

Figure 10:
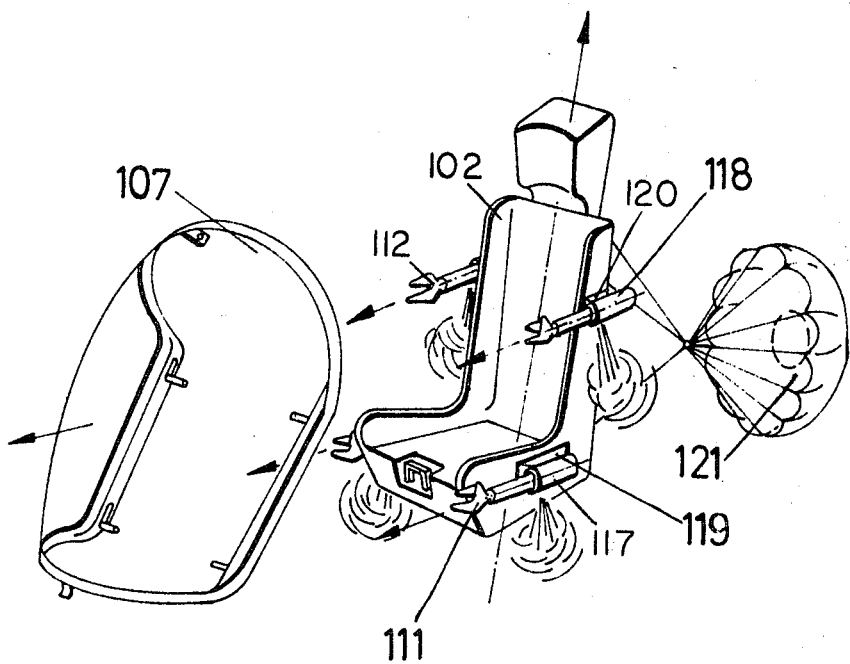
FIGURE 10 shows the arrangement of FIGURE 9, after igniting of the cabin-roof throw off charges.
Figure 11:
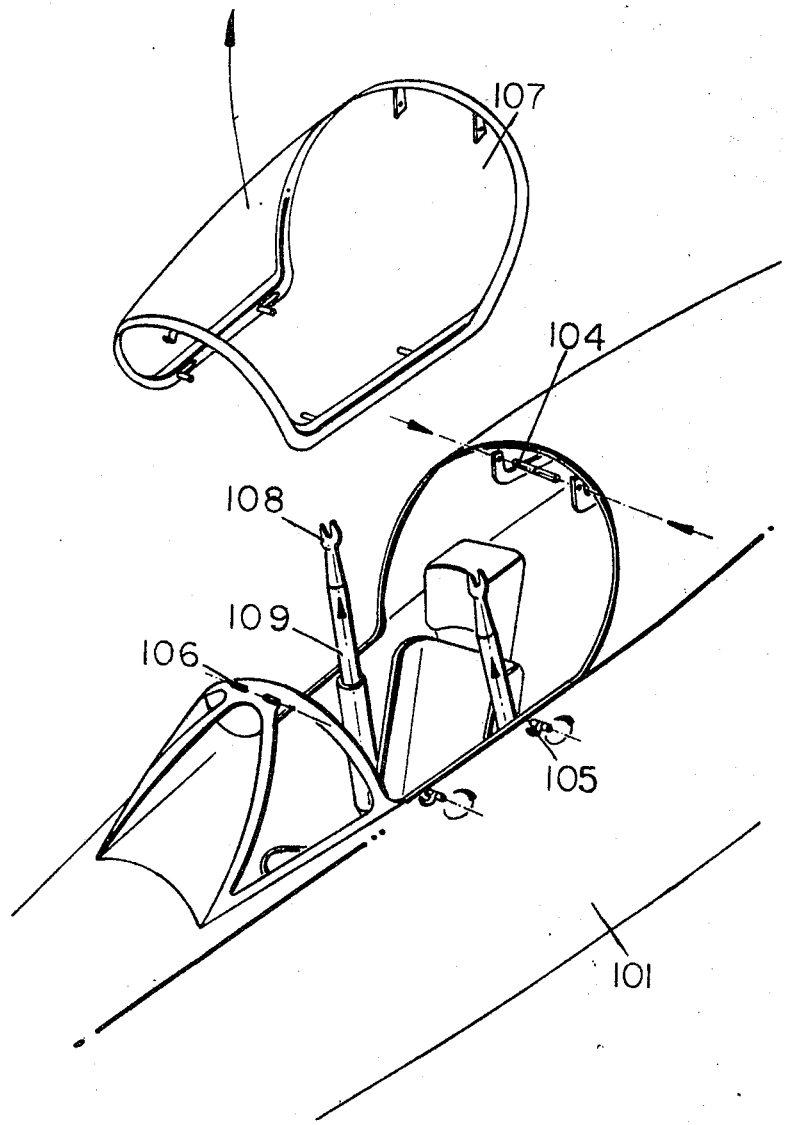
FIGURE 11 shows the arrangement of the ejection seat and of the individual functional parts after actuation of the catapulting at low speed of flight.

When the dynamic pressure drops below the danger limit for the pilot upon deceleration of the ejection seat 102, propellant charges 117 and 118 located in the stop struts 111, 112 are ignited by automatic means 119, 120 (FIGURE 10) controlled by a speed indicator or other measuring instruments. The separating of the cabin-roof from the ejection seat can be further assisted by the simultaneous opening of a decelerating and stabilizing parachute 121.

The further course of the operation is similar to the ejection seats constructed for subsonic speeds. If the automatic main release mechanism has recorded that ejection-seat catapulting is possible without employing the cabin-roof as a protective shield, the engagement of the two bearing pins 106 of the front cabin roof support, as well as the engagement of the bearing forks 108 into the cabin roof 107 will be prevented. Ignition of the ejection-seat gun will be delayed while the driver pins 104 of the rear cabin-roof support, as well as the four cabin-roof holding devices 105 are loosened. Once opened, as before, the devices will actuate the two telescopic pressure cylinders 109, and they will be extended to cause separation of the cabin-roof 107 from the fuselage 101 whence the airstream will blow it away. The ejection seat is then catapulted.

From the foregoing it is seen that two embodiments have been described, wherein each includes a canopy pivotally connected at its forward end to the plane structure, pivotally connected at a point spaced from its forward end to a pivoting actuating means, which actuating means is pivotally connected to the plane structure, whereby movement of the actuating means, as by movement of the ejection seat in the first embodiment, or by the separation of the actuating means telescoping members in second embodiment, pivots the canopy counterclockwise around the forward pivot to a position wherein its top surface substantially parallel to the ejection seat at which time the forwarding pivoting means becomes disengaged, and the stop struts carried by the ejection seat engage and position the canopy as a protective screen for the occupant of the ejection seat.

The following is claimed:

1. In an aircraft structure of the type provided with an ejection seat, catapulting means therefor, an opening in the structure above the ejection seat and a releasable canopy for closing said opening; the improvement comprising co-operating disengageable locking means pivotally mounting the forward end of the canopy with the plane structure, and co-operating canopy actuating means between the canopy and plane structure for pivoting the canopy to disengageable position from the locking means, said locking means providing a fixed pivot point for said canopy relative to said plane structure until said canopy is pivoted to disengageable position, said seat upon ejection movement disengaging said canopy from said plane structure and thereafter supporting it as a protective screen for the ejection seat.

2. The improvement in claim 1 wherein said canopy actuating means engages the canopy at a point removed from said locking means to provide the necessary leverage to pivot the canopy about the locking means and to the plane structure at a point below said canopy.

3. The improvement defined in claim 2 wherein said canopy actuating means comprise links having separable telescoping members, one member being pivotally connected to the canopy and the other member pivotally connected to the ejection seat and movable therewith.

4. The improvement defined in claim 3 wherein said links include pressure responsive means for separating the telescoping members.

5. The improvement defined in claim 4 wherein said pressure responsive means are explosive charges.

6. The improvement defined in claim 4 wherein said pressure responsive means are energy storing springs.

7. The improvement defined in claim 6 wherein one of said separable telescoping members has the energy storing spring therein normally tending to separate said telescoping members, said spring being compressed upon initial movement of the ejection seat and connected member to store energy in the spring.

8. The improvement defined in claim 1 wherein said disengageable locking means comprises cooperating members on the plane structure and canopy engageable when the canopy is in closed position and disengageable when the canopy has been pivoted substantially parallel to the ejection seat.

9. The improvement defined in claim 8 wherein one of said cooperating members is a pin transversely and removably mounted on the plane structure and the other member is a hook mounted on the forward end of the canopy and underlying the pin member when the canopy is in closed position.

10. The improvement defined in claim 9 wherein said transverse pin member is removable whereby the canopy may be pivoted around the actuating means.

11. The improvement defined in claim 8 including cooperating interlocking means on the canopy and the ejection seat which interlock upon disengagement of the canopy from its pivotal mounting.

12. The improvement defined in claim 11 wherein said interlocking means includes telescoping members and pressure responsive means operable to separate the telescoping members.

13. The improvement defined in claim 2 wherein said canopy actuating means comprises a link having separable telescoping members, one member releasably engaging the canopy, and the other member pivotally secured to a fixed point on the plane structure, and pressure responsive means within one of said members for separating the members and pivoting the canopy.

14. The improvement defined in claim 12 wherein the telescoping member engaging the canopy has a forked end underlying a pin on the canopy.

15. The improvement defined in claim 12 including upper and lower cooperating interlocking means on the canopy and the ejection seat engageable upon pivoting of the canopy to a position substantially parallel to the ejection seat.

16. The improvement defined in claim 15 wherein said interlocking means comprise spaced pins on the canopy and locking jaws on the telescoping members, and shock absorbing means carried by the canopy for said spaced pins.

References Cited

UNITED STATES PATENTS

| | | | |
|---|---|---|---|
| 2,516,902 | 8/1950 | Musser | 244—122 |
| 2,699,305 | 1/1955 | Turner | 244—122 X |
| 2,780,961 | 2/1957 | Musser | 244—121 X |
| 2,970,793 | 2/1961 | Beem | 244—122 X |
| 2,959,382 | 11/1960 | Turner | 244—141 X |

MILTON BUCHLER, *Primary Examiner.*

THOMAS W. BUCKMAN, *Assistant Examiner.*

U.S. Cl. X.R.

244—122